(12) United States Patent
Maurer et al.

(10) Patent No.: US 9,036,160 B2
(45) Date of Patent: May 19, 2015

(54) DEVICE FOR RECORDING BIOMETRIC DATA

(75) Inventors: Chris Maurer, Constance (DE); Roger Peter Van Diepen, Kilchberg (CH)

(73) Assignee: TOUCHLESS BIOMETRIC SYSTEMS AG, Pfäffikon (CH)

( * ) Notice: Subject to any disclaimer, the term of this patent is extended or adjusted under 35 U.S.C. 154(b) by 655 days.

(21) Appl. No.: 12/737,757

(22) PCT Filed: Jun. 12, 2009

(86) PCT No.: PCT/EP2009/004221
§ 371 (c)(1),
(2), (4) Date: Feb. 14, 2011

(87) PCT Pub. No.: WO2010/017858
PCT Pub. Date: Feb. 18, 2010

(65) Prior Publication Data
US 2011/0135164 A1  Jun. 9, 2011

(30) Foreign Application Priority Data

Aug. 14, 2008  (DE) .......................... 10 2008 037 741

(51) Int. Cl.
*G01B 11/14* (2006.01)
*G06K 9/00* (2006.01)
*G06K 9/20* (2006.01)

(52) U.S. Cl.
CPC ........ *G06K 9/00033* (2013.01); *G06K 9/00382* (2013.01); *G06K 9/2036* (2013.01)

(58) Field of Classification Search
CPC .......... G06K 9/00033; G06K 9/00382; G06K 9/2036
USPC .............................. 356/71; 382/115, 124, 126
See application file for complete search history.

(56) References Cited

U.S. PATENT DOCUMENTS

| | | | | |
|---|---|---|---|---|
| 3,482,498 | A | * | 12/1969 | Becker ............................ 396/15 |
| 3,576,538 | A | * | 4/1971 | Miller ............................ 235/380 |
| 5,177,802 | A | | 1/1993 | Fujimoto |
| 5,750,986 | A | * | 5/1998 | Genovese ..................... 250/235 |
| 6,122,394 | A | * | 9/2000 | Neukermans et al. ........ 382/124 |
| 7,812,935 | B2 | * | 10/2010 | Cowburn et al. ................ 356/71 |
| 8,224,064 | B1 | * | 7/2012 | Hassebrook et al. ......... 382/154 |
| 2005/0099619 | A1 | * | 5/2005 | McClurg et al. ................ 356/71 |
| 2006/0120576 | A1 | | 6/2006 | Chen |
| 2008/0056539 | A1 | | 3/2008 | Sweeney |
| 2008/0104415 | A1 | * | 5/2008 | Palti-Wasserman et al. . 713/186 |

FOREIGN PATENT DOCUMENTS

| | | |
|---|---|---|
| DE | 28 46 189 | 4/1979 |
| DE | 3424955 | 1/1986 |
| DE | 36 02 995 | 8/1986 |
| DE | 198 18 229 | 10/1999 |
| DE | 101 00 616 | 7/2002 |

(Continued)

*Primary Examiner* — Kara E Geisel
*Assistant Examiner* — Rufus Phillips
(74) *Attorney, Agent, or Firm* — Jacobson Holman, PLLC

(57) ABSTRACT

The invention refers to a device for recording biometric data, such as lines of finger or hand. A rest is provided on the device for the hand and finger, respectively, as well as an illuminating unit. According to the invention an illuminating unit and/or rest is provided that can traverse and be positioned.

24 Claims, 7 Drawing Sheets

(56) References Cited

FOREIGN PATENT DOCUMENTS

Figure 1:
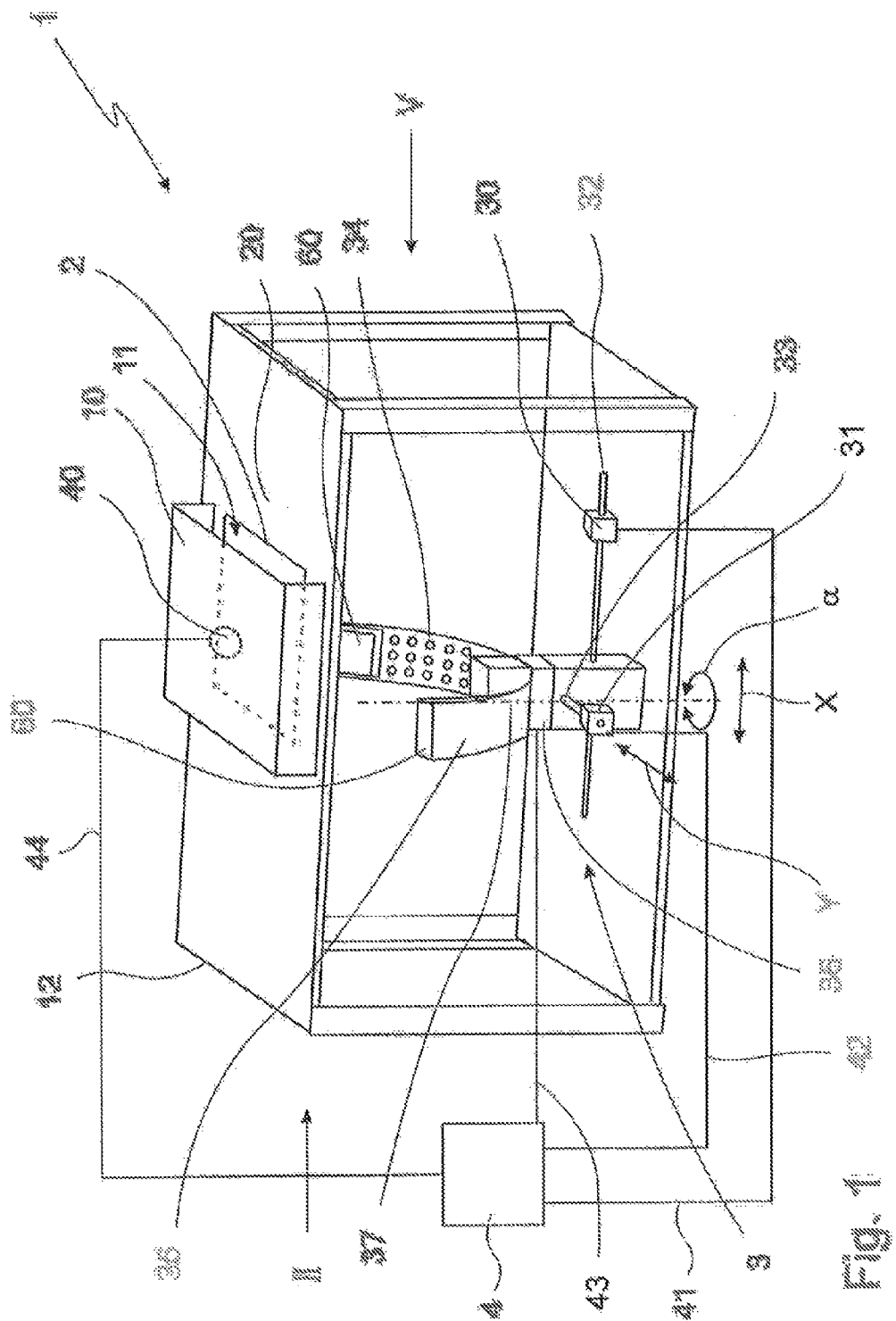

| | | |
|---|---|---|
| DE | 10 2005 050 807 | 4/2007 |
| EP | 0 168 007 | 1/1986 |
| EP | 1 643 416 | 4/2006 |
| JP | 61292786 A * | 12/1986 |
| WO | 2007/050776 | 5/2007 |

* cited by examiner

DEVICE FOR RECORDING BIOMETRIC DATA

This invention has been realised with the support of the US government under the Grant number 2005-IJ-CX-K071, awarded by the Department of Justice. The government has certain rights to the invention.

This is a national stage of PCT/EP09/004221 filed Jun. 12, 2009 and published in German, which claims the priority of German number 10 2008 037 741.4 filed Aug. 14, 2008, hereby incorporated by reference.

The invention refers to a device for recording biometric data, such as, for example lines of fingers and/or hand, wherein on the device a rest for the hand and fingers, respectively, as well as an illuminating unit are provided. Devices described in the beginning are known in the state of art. A solution is known in the state of the art that describes recording the finger print by a light beam with successive scanning over the finger print, wherein this and the light beam approach each other.

Furthermore a device for measuring elevations and/or recesses of a surface is known.

It is an object of the present invention, as described before to produce recordings, that means pictures, with good quality within a reasonable time.

In order to solve this problem the invention refers to a device as described in the beginning, and suggests that an illuminating unit that can traverse and be positioned, and/or a device that can traverse and be positioned, and a positioning control are provided, and the device is characterized in that the positioning control evaluates information about the position and/or size and/or direction of the fingers and/or the hand.

The device serves for offering a suitable bearing for the hand, as a rule for the carpal bone or the ball of the thumb. The rest can be designed here, for example, as support, that means the hand is supported on the rest, or the rest is arranged above the palm, if, for example, the hand is pressed with the palm upwards towards the rest. However, the rest can also be orientated vertically.

It has been recognized that for the production a recording with good quality the illumination of the surface of the fingers and the correct positioning of the finger/hand area that has to be photographed or recorded with reference to the recording unit is decisive. Here cleverly the relative position of the rest and the illuminating unit are set in such a way that perfect optical conditions prevail.

To achieve a perfect optical arrangement several modifications have been found. One of these is, first of all, an illuminating unit that can traverse and be positioned and that is preferably combined, for example, with a stationary rest for the hand. This is also the modification of the invention that is illustrated in the enclosed figures. However, the invention is in no way restricted to that. The second modification according to the invention provides namely is a rest that can traverse and be positioned that is combined preferably with a stationary illuminating unit. In such a combination a relative positioning of the fingers and the hand, respectively, is possible with respect to the illuminating unit to get rather good recordings in a reasonable time.

A third modification according to the invention provides that the illuminating unit as well as the rest can traverse and be positioned. Thus in particular a very fast mutual orientation is achieved as the positioning motions are distributed to both elements, the illuminating unit and the rest.

The device known in the state of the art, that carries out a successive scanning above the finger print, has the advantage that between the illuminating unit or the rest, and the hand or the fingers there are no other components. According to this a contactless recording of biometric data is not known by citations of the state of the art as there the fingers are supported on a slab. Furthermore, in this citation it is not disclosed that the positioning control evaluates information about the position and/or the size and/or the orientation of the fingers and/or the hand. It is rather only disclosed there that a converter is provided generating a signal when a support, on which for example the fingers rest, is shifted about a given way.

In the second known solution of the state of the art that has been described in the beginning, it is only described that it is possible to equip the illuminating unit with at least two kinds of different illuminating elements that differ in the emitted light colour. A hint of developing a device as defined in the state of the art and the preamble in claim 1 in such a way that a positioning control evaluates information about the position and/or the size and/or the direction of the fingers and/or the hand is not described in this citation. However, this design makes positioning the hand or fingers exactly to achieve a perfect recording result possible. In a number of the solutions of the state of the art a number of recordings cannot be used so that new recordings are required. Of course, this delays the entire recording and evaluating process considerably. These disadvantages are completely removed by the solution according to the invention.

As an essential advantage of the invention is that there are no other components between the illuminating unit and the hand or the fingers, in particular the recording of the biometric data is carried out contactless. Contactless scanning of the surface and recording of the corresponding image result in an absolutely distortion-free picture of the finger or hand lines, what makes comparing considerably easier. The transparent support windows, otherwise known in the state of the art, on which the fingers have to rest, are not necessary here. This improves the quality of the recording itself, namely sweat, dirt and other deposits on these support windows otherwise impair the image. As these supports consisting of translucent material are not provided according to the invention, the quality of the picture is improved in a simple manner.

For a perfect positioning of the illuminating unit or the rest in a modification according to the invention for positioning the illuminating unit or the rest a positioning control is provided.

Through the positioning control information about the position, size and/or direction of the fingers and the hand, respectively, are evaluated. It is, according to the invention, possible here that through the device according to the invention the image of only one finger or the image of several fingers can be recorded simultaneously. However, to comply with the rather complex optical situation, a perfect positioning of the rest or the illuminating unit is provided. For that, first of all, the exact position, size and direction of the finger or the fingers and/or the hand are required.

The device according to the invention is equipped for that in particular with a positioning sensor transmitting information about the position, size and/or direction of the finger and/or the hand to the positioning control. Of course, the positioning sensor, depending on the design of the device, transmits also information of hand areas or several fingers. Cleverly, the positioning sensor is here, for example, an area scan camera or a line scan camera (CCD); and with suitable algorithm rules the direction, that is the orientation of the finger ideally recorded as cylinder or its end, is determined by the recording of the positioning sensor of the preferably spread hand. Through this information then the positioning control determines the respective coordinates where either the rest and/or the illuminating unit have to be positioned to get a perfect picture or recording.

For the design of the positioning sensor on or in the device there are several modifications according to the invention. First of all, it is suggested to arrange the positioning sensor stationary on the device. The positioning sensor is here cleverly arranged on the side of the hand or the finger opposite the illuminating unit. This means, if, for example, the illuminating unit is arranged below the hand or the finger the positioning sensor is provided above. Thus the space in the device is used perfectly and the single elements do not interfere with each other. Of course, the invention also comprises the kinematic reversal, that means, if the illuminating unit is arranged above the hand, the positioning sensor is arranged cleverly below the hand. Basically, however, it is also possible that the positioning sensor and the illuminating unit are provided both also on the same side of the hand.

In another modification according to the invention it is provided that the positioning sensor is designed traveling together with the illuminating unit or the rest. In such a design in a simple way a self-adjusting of the rest or the illuminating unit with reference to the other element, that is the illuminating unit or the rest, can be carried out.

In order not to interfere with the recording of the biometric data, that is the hand or finger lines, cleverly another spectral region is used for the positioning sensor than for the recording of the finger or the hand. Infrared light has proved convenient for this purpose. However, any other spectral region can be used. Of course, the positioning sensor is adjusted to this wavelength interval with respect to its spectral sensitivity. It may be possible to do without additional illumination, if the sensitivity of the camera is adapted to the heat development of the human hand or the finger. Otherwise, for example, a suitable illumination is arranged on the side of the hand opposite the positioning sensor, and the sensor detects the silhouette. Cleverly, wavelengths are employed which are not noticed by humans and/or illumination power is used that humans do not detect and that do not harm humans in order not to frighten the user.

According to the invention traversing or positioning of the illuminating unit or the rest is suggested. Of course, this requires a suitable traveling drive, either for the illuminating unit and/or the rest. The positioning coordinates determined by the positioning control are here transferred to the respective traveling drive or rotary drive (see below). Through the positioning sensor, first of all, the position, place and size of the finger, several fingers, a hand area or the hand is determined, and provided as corresponding target coordinate. Through this target coordinate then the positioning control controls the respective traveling drives in such a way that the illuminating unit or the rest is positioned perfectly.

In a preferred embodiment of the invention it is provided that, while the illuminating unit or the rest is positioned with respect to a first finger or hand area, the current position of the finger or hand area is furthermore collected by the positioning sensor, and information about position, size and/or direction of the finger or hand area is continuously transmitted for readjusting purposes of the traveling drives or the rotary drives to the positioning control. If, during the orientating of the rest or the illuminating unit to a first finger, this finger slips or is moved, of course, the illuminating unit and the rest, respectively, must be able to follow this situation. That means a readjustment is installed to guarantee an optical arrangement as perfect as possible. It is clear that here the position, size and/or direction of the finger plays a role, wherein, depending on the design, either only the position or only the size or only the direction of the finger or the hand area (several fingers, a part of the hand or the complete hand) is controlled and monitored. This goes also for another place of this invention.

Another improvement of the invention suggests that, while the illuminating unit or rest is positioned with reference to a first finger or hand area, the positioning sensor determines the position, size and/or direction of a second finger or hand area, and transmits it to the positioning control which determines from that the positioning data for the traveling drives so that, after the recording of the biometric data of the first finger or hand area has been finished, positioning of the second finger or hand area is carried out. This suggests a simultaneous position recording while the rest or illuminating unit still points to the first finger or hand area. This suggestion achieves a suitable acceleration for the recording of the single pictures as already after the recording of the first finger or hand area has been finished, the rest or the illuminating unit is shifted immediately to the second finger or hand area. It is not necessary to wait until corresponding data have been collected and evaluated. This idea as well as the previous one is achieved in particular by a suitable high computer performance and clever algorithm, and eventually leads to a reduction of the time necessary for working while the quality of the resulting recordings remains high. Finally, delay times are minimized by this suggestion. It is clear that the above-mentioned ideas referring to the device can be claimed also in the frame of a procedure for recording biometric data and thus are also disclosed. It is provided according to the invention in particular that also all other characteristics described only with respect to the device which can also be claimed in connection with process claims or also such combinations of characteristics of process and device claims are seen as comprised by the invention.

In a preferred embodiment of the invention it is provided that the illuminating unit or the rest can traverse and be positioned in one or more planes along two axes orientated to each other angular, in particular rectangular. The plane is arranged here according to the invention either above or below the rest or hand. This suggestion according to the invention achieves that the illuminating unit or the rest can move and be positioned along at least two axes. That allows a good positioning of the illuminating unit or the rest relatively to each other.

The invention furthermore provides that the plane is arranged above and/or below the rest. As already explained, the arrangement of the rest with reference to the traversable illuminating unit is very variable; the invention allows choosing an arrangement where the palm or the back of the hand is directed upwards. The result is then that the plane is arranged above the rest when the palm is directed upwards. When the back of the hand is directed upwards, generally the plane is below the rest. The plane is here defined such that it is defined by guide rails, for example a crossbar guide. Depending on the design of the illuminating unit it is also possible that, for example, two planes are provided for guiding the illuminating unit, and then, for stability reasons, one plane is arranged above and one plane below the rest. These planes are here not necessarily defined by the provision of a suitable traveling drive on them. A plane is already defined by serving for guiding (without drive).

Besides arranging a plane above and/or below the rest, the invention also comprises a solution where the plane is arranged at the side next to the rest. In this case the plane is orientated, for example, vertically, because also the palms are in contact with the rest essentially vertically. An arrangement of this type is very ergonomic as it corresponds with the main position of the hand.

In the simplest embodiment the rest is designed, for example, as rest edge. The rest may often be also a so-called planar part to offer, for example, the palm or the ball of the thumb a suitable support. This then defines also the orientation and direction of the hand, and it is therefore convenient when the plane is orientated essentially parallel to it.

For a perfect illumination of the hand lines, finger lines, hand areas or fingers and so on to be recorded a number of illuminating elements are provided on the illuminating unit.

It has already been explained that the illuminating unit can be positioned along at least one, preferably two, axes (in one plane), if necessary also along three axes, that is in space. In addition to these linear axes, however, it is also provided that the illuminating unit has a rotary part that can be rotated around a rotational axis, carries the illuminating elements and can be moved and positioned by a rotary drive. Thus it is possible that the illuminating unit is orientated perfectly to the position of the fingers as the fingers are often braced and therefore are arranged in their respective longitudinal axis always around a certain pivot angle α to one another. Such a design can correspond with this appearance, cleverly here the rotational axis is orientated angular, in particular rectangular to the plane; this is the result of the geometric situation. However, the invention is not restricted to this, of course, also rotational axes with another or additional orientation can be provided, so that the illuminating unit becomes an element that can be moved in the space comfortably and also be rotated and thus positioned.

As already described a positioning control is provided detecting the suitable orientation of the fingers by means of the positioning sensor. The result is here also a corresponding pivot angle α around the rotational axis which is calculated and has to be set to achieve a perfect recording. The positioning control therefore acts here also on a suitable rotary drive.

In a development according to the invention it is provided that the illuminating unit is equipped with at least two kinds of different illuminating elements differing with respect to the emitted light colour. There are several reasons for the use of different light colours, that is different spectral parts. First of all, it has to be taken into consideration that, of course, the resulting recording depends on the sensitivity of the recording unit, that is the camera. If, for example, here green- or blue-sensitive cameras are used it is, of course, convenient to adapt the used light colour to this sensitivity.

Furthermore, the use of different spectral colours or light colours prevents, of course, an undesired influence of the different light sources. This depends eventually also again on the corresponding sensitivity. Thus, for example, basically a first or two light colours (blue and green) can illuminate the surface altogether, by means of, for example, red light colour then suitable orientating lines or other orientation aids are projected onto the surface which, however, do not impair the basic illumination.

It has already been pointed out to employ, for example, infrared light for the operation of the positioning sensor as also this light colour differs from the other used light colours.

Furthermore it is provided that other illuminating means are provided in the device. The result is that besides the moving illuminating means, that means traveling together on the illuminating unit, that are realized in the illuminating elements also still stationary illuminating means are arranged that are located, for example, in the housing of the device, for example on the roof, the side walls or the bottom in a suitable way. However, it may be that these illuminating means are equipped with separate adaptation drives and so on to take over additional special illuminating tasks, for example in difficult areas.

According to the invention it is equal here whether the light emitted by the illuminating unit and the light emitted by illuminating means (in the device) has identical or different light colour. Also the illuminating means arranged stationary in the device have illuminating tasks to make an optimal recording possible. Therefore, they support the illuminating fields generated by illuminating unit in a suitable way. This can be done by using identical light colour as well as by using different light colours, depending on the way the illuminating concept is realized. Thus, for example, the illuminating means can be integrated in the concept of using different light colours, if suitably sensitive cameras are provided for that.

In a preferred embodiment of the invention it is provided that directional light of the illuminating elements of the illuminating unit is employed. According to the invention, a so-called bright field illumination is provided. The recording units observe here the suitable hand or finger area surface in total reflection. This concept improves considerably the quality of the recordings, and allows to make the desired recordings in a rather short time. Through this concept a rather contrast-rich recording is achieved for telling apart in particular the hills of the finger lines from the limiting valleys.

As an alternative to the use of a directional light, that is realized, for example, by a suitable optic image system, according to the invention, in the same way also the use of a diffuse light field of the illuminating unit is possible. A suitable diffuse light field is achieved, for example, by means of the Ulbricht globe or other optical components generating a diffuse light field.

The single illuminating elements have, according to the invention, at least one illuminant, and, preferably, one optic image system through which the light segment generated by the illuminant is imaged to an illuminating segment of the hand or finger. It is obvious that not the complete hand or the complete finger is illuminated with the single illuminating element, although this is basically possible. However, it is convenient to divide the surface of the hand or finger to be illuminated into a number of single segments which then are illuminated by suitable illuminating elements with an angle perfect for the recording (total reflection). This illumination concept uses eventually the circumstance that the employed cameras of the recording unit have a somewhat larger visual range under which suitable pictures or picture information is taken. This cone-like visual range is, seen in total reflection, projected onto the hand or finger surface what leads to corresponding places where the illuminating elements have to be arranged. The illuminating elements illuminate the respective surface through directional light.

The result of this concept is that the respective visual cones of the cameras employed by the recording unit overlap in such a way that on the same spot on the illuminating unit illuminating segments in different directions have to be generated. This is solved by several, at least two illuminants for one illuminating element. Furthermore, at least two optic image systems are provided. The visual ranges generated by the illuminants are imaged on the hand or finger in different segments. The solution according to the invention creates, according to this, cleverly on one geometric spot different light cones or illuminating segments in different directions for different single cameras. However, the invention is not restricted to this. According to the invention, it is at least provided that the illuminating element has at least one illuminant.

Cleverly, it is provided according to the invention that the illuminating element has an optic image system to image the light segment generated by the illuminant to an illuminated segment of the hand or finger. The optic image system comprises here according to the invention at least one or more of the following optical-components, namely a diffuser, a lens, a Fresnel lens, a free-form reflector, a paraboloidal-type reflector, an objective, a reflector, a prism or the like. Through the diffuser a light segment as homogenous as possible (with reference to the local resolution) is generated. Through the lens or a Fresnel lens a suitable focusing on the respective area on the finger or hand is achieved. However, it is also possible to achieve a suitable image by a reflector arrangement, for example a free-form reflector or a paraboloidal-type reflector. This concept is indicated, for example, in FIG. 6.

In a preferred embodiment of the invention on both sides of the rest plane defined by the rest on the illuminating unit, if necessary separated by a clearance on the level of the rest plane, illuminating elements are provided.

It is an aim of the invention to produce a recording as comprehensive as possible of the finger lines in an angle range of about at least 175°, preferably about 180° to 220°. This angle values refer to an angle range around the finger axis and achieves that a recording from nail to nail is realized. As the pictures have to be taken in total reflection to get a quality as high as possible, and the cameras of the recording unit are arranged below the support plane, the result will be that single illuminating elements are arranged above the rest plane, if necessary separated by a clearance at the level of the rest plane.

As the concept for preparing the recordings is contactless, that means the fingers do not have a support surface, a safety area is defined by means of a light curtain (light barrier as planar element) to separate the hand safely from the movable elements of the movable illuminating unit. If the user points his fingers, for example, downward, and violates the light curtain, this leads to an interruption of the motion of the illuminating unit to exclude reliably possible risks of injuring (for example squeezing).

Furthermore, at the level of the rest plane there is also a so-called side tracking, this is a suitable monitoring unit for the control of the level of the resting hand. In particular, if directional light is used, but also as a consequence of the circumstance that the cameras do not have a very sharp definition of the image, it has to be made sure that the hand or fingers to be recorded are supported in a correspondingly defined corridor of height. This is achieved by this side tracking camera that is arranged, for example, in front of the finger tips or on the side next to the fingers, and is operated, for example, with infrared light (commonly with light of another light colour than the otherwise used light to avoid negative influences).

It is in particular suggested according to the invention that the illuminating unit is arranged above the support plane in such a way that the finger is illuminated from above the bed of nails. This carries out the concept of total reflection perfectly; the illuminating unit is equipped with a suitable boom to hold also the illuminating elements arranged above the support plane reliably.

Furthermore it has been found in a modification according to the invention that the illuminating elements are arranged on the illuminating unit in a sort of partial trough-shape corresponding with the surface of the underside of the finger tip, and thus form an illuminating surface. A design of this kind is the result of choosing about the same geometric characteristics for the different illuminating units. Thus then all illuminating means have a similar optic task, while the marginal geometric conditions remain similar, namely to project a suitable illuminating segment onto the fingers or the hand. This then leads to accordingly identically designed illuminating elements what makes handling somewhat easier. Characteristically by means of the device one finger after the other is recorded in a sequence. As a recording from bed of the nail to bed of the nail or from nail to nail has to be carried out, it is convenient that the fingers are accordingly spread and the illuminating unit is able to illuminate the complete desired angle range, as described. Therefore the illuminating unit is shaped like the surface of the underside of the finger tip what corresponds essentially with a part trough-shape. The result of this suggestion according to the invention is a part trough-shaped arched illuminating surface. Otherwise, the illuminating surface is arched in any way.

In a preferred embodiment of the invention it has been found that other illuminating elements spaced apart from the illuminating surface are provided. Because of the arrangement of the clearance at the level of the rest plane the situation is such that the illuminating elements arranged in the illuminating surface can illuminate these partial segments insufficiently. However, if suitable illuminating elements, that are put back spaced apart from the illuminating surface, are used, also these segments will be illuminated perfectly.

In a preferred embodiment of the invention it is suggested furthermore that the illuminating unit consists of two or more illuminating groups each comprising at least one illuminating element, and the illuminating groups emit light at different times. It has already been pointed out that the recording unit comprises several cameras to allow in particular the recording of a stereoscopic picture. Therefore the visual range of the two cameras overlaps partly. However, now to get a good quality of recordings it is provided according to the invention, on the one hand, to angle the illuminating elements each under total reflection with reference to the illuminating segment, but also the cameras each time to total reflection, that means with reference to the vertical line, tilted around about 5° to 15°, preferably about 10°. In order not to impair the illuminating system it is suggested according to the invention that each camera of the recording unit has its own illuminating system separated from each other, the result of which is that it is convenient to divide the number of the illuminating elements in two or more illuminating groups, and the illuminating groups then emit light at different times.

The suggestion according to the invention, however, offers even another range of application. The positioning control or the positioning sensor determines, as it is generally known, the position, size and direction in particular of the finger. Now the diameters of fingers differ considerably, and thus a perfect illuminating system for a number of different finger diameters may only be realized with difficulties or not at all. Therefore it is provided in a modification according to the invention that different illuminating groups emit light at different times depending on the thickness of the finger, that means depending on an information of the positioning control. This also avoids an impairment of the bright field view in the overlapping area of the visual ranges of the cameras reliably. It has to be taken into consideration here that the combination of the single groups is not static, that means unchangeable, but it is actually dynamic, that means the combination of the groups is done depending on the situation in an alternative according to the invention, for example by the positioning control.

According to the invention therefore a control for the illumination is provided, and the positioning control transmits information to the illumination control about the position, size and/or direction of the fingers and/or the hand so that a suitable selection of the illuminating groups or illuminating elements to be put in and their sequence follows.

It is clear that the division of the number of illuminating elements into different illuminating groups does not necessarily lead to an use of all illuminating elements. On the other hand, it is actually possible, that single illuminating elements belong to several illuminating groups. This depends on the respective divisions to achieve a record as perfect as possible which requires an illumination as perfect as possible.

According to the invention a large range of illuminants is suggested. These may be, for example, LEDs, a laser diode, a laser, a bulb, for example a small size bulb or a halogen bulb, or also the light exit end of an optical wave guide. Illuminants are therefore all optic elements that generate or emit light as the illuminants do not necessarily emit light themselves, but also elements that are illuminants providing their light, for example, at another place without generating this light at this place. An element of this type has also to be seen as an illuminant as with an illuminant it is decisive to provide a suitable light cone. This light cone may be generated or transferred. The light exit end of an optical wave guide is a passive illuminant in this respect as, for example, at a central illuminating spot a number of optical wave guides are fed by light which then guide the light in the single illuminant elements and provided them there in a suitable way.

In a preferred embodiment of the invention it is suggested that as light colour of the illuminating elements cyan, green and/or blue is used. Preferably, a recording unit is employed the cameras of which have a high sensitivity, for example for green and blue. Therefore it is convenient to use green or blue as light colour for the illuminating elements to hit exactly this area of sensitivity of the camera.

The range of sensitivity of the cameras is not really a narrow band, but covers a certain range of frequency so that, for example, a cyan light colour is convenient, if only one wave length is used, as the green as well as the blue sensitivity of the camera is sufficiently engaged. Therefore, the green and blue receptors of the camera are used equally so that the local resolution is improved.

In particular the modification that uses green and blue as light colours provides the chance of illuminating the illuminated segments arranged adjacent on the fingers or hand with light of different light colour. Of course, any other different light colours are suitable for this. The only condition that has to be taken into consideration is the colour sensitivity of the used camera. The effect of this embodiment is as follows:

The illuminating elements generate each time a cone-like or pyramidal light segment that leads to a square, polygonal, oval or round illuminated segment on the surface of the fingers or hand (depending on its curve). As the single fingers of a person to be recorded or of different persons are surely not identical, the consequence is that the marginal areas of the adjacently arranged illuminated segments overlap in such a way that instead of a directional image observed in total reflection rather diffuse light conditions prevail. However, if now a colour system as described is used where the light colours of adjacently arranged illuminating segments alternate, and the light colours are chosen depending on the sensitivity of the cameras, these marginal areas do not interfere anymore as different colour receptors are referred to which can accordingly be evaluated separately.

Furthermore, the invention suggests that the illuminating unit projects at least one bundle of parallel lines onto the surface of the fingers or hand. Alternatively to that, it is possible to provide in the device, for example stationary, (or also traveling together with the illuminating unit/rest) an illuminating element which projects bundles of parallel lines onto the surface of the fingers or hand.

This bundle of lines or in particular two bundles of lines cutting themselves at a certain angle, that is they generate a grid structure, makes the spatial arrangement and orientation of the single areas possible. Cleverly here for the bundles of lines or the grid projection (this must not compulsory be formed of two bundles of lines rectangular to each other, they can also cut each other acutely) another light colour differing from the light colour of the illumination of the illuminating segments is chosen. Often cameras with several colour sensitive receptors are used, the grid projection serving for the orientation/positioning is put on one light colour that also corresponds with the colour sensitivity of a camera; for this, for example, red light is used. The use of another light colour of the bundles of lines or the grid projection as light colour of the radiating of the illuminating segments avoids a corresponding influence and loss of information. Besides, the line projections that usually cross a number of illuminating segments, do not impair the usual illuminating situation of the recording.

In another advantageous embodiment of the invention additional illuminating elements are provided on the stationary parts of the device. As already explained these illuminating elements can serve for the projection of bundles of parallel lines or the projection of a grid and so on. The employment of accordingly arranged illuminating elements is, for example, convenient when, through the illuminating elements on the in particular traversing illuminating unit certain segments cannot be illuminated sufficiently.

According to the invention it is provided that the illuminating element itself has an illuminant, that means it is designed actively, or, for example, a reflector reflects an illuminating field. A modification of this type is a passively designed illuminating element. Both modifications are part of the invention.

In a preferred embodiment of the invention it is provided that at least one illuminating element or one part of an illuminating element has an additional adaptation drive. Through the adaptation drive an illuminating element is designed in such a way that it can be set perfectly one more time in particular to a suitable illuminating segment. This can be here an illuminating element that is part of the illuminating unit, that means it travels together with it, however, it can also be a stationary additional illuminating element arranged, for example, on the inside of the housing or the rest and so on. Besides the possibility of designing the entire illuminating element adjustably by means of the adaptation drive it is, according to the invention, also provided that at least a part of the illuminating element can be adjusted by means of an adaptation drive. This can be, for example, the single optical elements of the imaging lens system (for example the lens) equipped with a suitable adaptation drive.

The positioning drive is preferably designed in such a way that it also acts on the adaptation drive, and thus reaches a special adjustment of the illuminating element equipped with a separate adaptation drive. Thus the control of the adaptation drive again depends on the information collected by the positioning sensor, that means the position, size and/or direction of the finger or the hand.

A recording unit helps to generate the pictures, that is the recordings of the hand or finger lines. Cleverly, the recording unit is arranged on the illuminating unit or traveling with the illuminating unit in order to use the perfect optical situation. It is suggested here that the recording unit or its single cameras observe the surface of the finger or the hand under total reflection. The result is here a suitable tilting of the recording unit with reference to the vertical line in such a way that it records the respective visual range under total reflection with reference to the illuminating unit or the illuminating segments generated by the single illuminating elements.

Therefore it is convenient that the recording unit is combined with the illuminating unit very closely. It is in particular suggested that the recording unit is designed traveling together with the illuminating unit, and thus in a simple manner perfect optical conditions are provided.

As a three-dimensional image of the finger tip or the finger or hand area has to be recorded, it is convenient to record a stereoscopic picture. This is achieved by a number of single cameras forming the recording unit together. Preferably here, for example, three single cameras altogether are used, wherein a first, central single camera is arranged vertically below the extended finger. In addition to this first, central camera other single cameras are arranged with a swiveling angle of about 50° to 80°, preferably of about 60°, each on the side with reference to the central axis.

The central axis extends along the longitudinal extension of the finger and is a straight line that can contain in particular the center of gravity of the finger. Seen from the front, the center axis defines a point, the single cameras are arranged around the center axis with a suitable swiveling angle, the visual range, however, is not arranged exactly below from the bottom to the top, but runs slightly back over the vertical line or adjusted to the front.

In a preferred embodiment of the invention it is provided that the single cameras are orientated tilted to the hand lines or the area of the finger lines with reference to the vertical line in such a way that they record the picture under total reflection. The recording unit now observes, on the one hand, hills and valleys illuminated with directional light according to the bright-field method, for example in green or blue colour by means of its several different single cameras, and additionally the camera registers the grid projection emitted, for example, in red. Because of an appropriate calibrating process the evaluating unit in downstream direction to the recording unit is able to define by means of the grid projection the actual position of the recorded picture information (hand or finger lines) in the space. The arrangement of the different single cameras is chosen here in such a way that they may produce a stereoscopic picture, but in the overlapping area of the first and second cameras there is the risk of an information loss because of the diffuse light. To avoid this the invention suggests two strategies.

On the one hand it is possible, first of all to switch on the illuminating system for the first camera until the picture has been taken by the first camera, then the illuminating system for the second camera is switched on (the illuminating sensor for the first camera is switched off), so that also this can take the corresponding picture. The sequence of these two pictures is very short, so that it does not have to allow for motions and so on. The two recordings may be finished after a few hundredths of milliseconds. As the overlapping area occurs in particular with the centrally arranged single camera the illuminating systems are chosen such that in a first illuminating group the illuminating elements required for the respectively exterior single cameras are switched on, after that they are switched off, and then the illuminating group or the illuminating system for the centrally arranged single camera is switched on. It is, of course, possible to reverse the sequence, that means to begin the recording with the centrally arranged single camera, and, after that, to use the two exterior cameras. The opposing exterior cameras do not overlap each other, their illumination does not interfere with one another.

The single cameras are arranged around the circumference (with reference to the center axis of the finger) of the finger in such a way that a recording of the complete finger line is possible in an angle of at least 175° or more (preferably, for example, 180°-200° or 220°), in particular form bed of the nail to bed of the nail. As the entire rolled-off surface of the finger is seen by the three arranged cameras, it is basically possible to get a complete image of the finger tip with the associated finger line as recording.

In a preferred embodiment of the invention a stroboscope illumination of the illuminating unit is provided that is synchronized with the recording by the recording unit or the single camera. With respect to the stroboscope illumination it has been found that the motion of single fingers of the hand or also the motions of the image recording installation such as, for example, the camera, can be eliminated when the recordings are produced. Therefore blurred or unsharp recordings can be excluded.

Furthermore the problem according to the invention is solved by using the projection of a grid onto the fingers or the surface of the hand, wherein from the picture taken by a recording unit or its several cameras it can be concluded to the actual spatial arrangement of the arched finger, hand or hand surface. The grid is generated here, for example, by two bundles of parallel lines tilted to one another. These are projected onto the surface in a light colour for which the recording unit or the cameras have a separate sensitivity exclusively. In a modification according to the invention for that, for example, red is used as light colour which refers to the red channel of the corresponding recording camera. The used single camera has two other sensitivities, namely for green and blue light. These two colour channels are used for the actual information about the texture of the finger lines (is it a hill or a valley). In the single camera therefore there is the following information per pixel (comprises three colour receptors):

Red Channel
  light—picture point is on the projected line or point of the grid crossing,
  dark—picture point is besides the grid lines
Green or Blue Channel
  light—picture point shows hill of the texture of the finger,
  dark—picture point shows valley of the texture of the finger (depending on the adjustment).

Depending on the resolution of the camera this information is defined for a number of single picture points; the complete spatial image, however, is not carried out before another pass of this information through the evaluating unit.

First of all, however, the grid projection has to be calibrated in such a way that this grid projection points at a suitable calibration aim, and this image is also recorded in a corresponding manner. Of course, the geometry of the calibrating aim is known so that the evaluation algorithm of the evaluating unit can draw its conclusions how the corresponding spatial arrangement is. By means of this calibrating information it is then possible to determine the actual spatial coordinate of the picture point in the surface of the finger. The result is a corresponding 3 D image of the finger without blurs as the finger is neither squeezed nor deformed during recording. This is the advantage of the contactless recording process that is also suggested according to the invention.

Through this information it is now, of course, possible without any problems to generate a blur-free roll-off picture of the surface area of the finger. Thus the use of the projection in the grid onto the surface of the finger or hand also serves for producing a blur-free image of the rolled-off finger surface.

In connection with this application and this invention it is pointed out that all characteristics mentioned in connection with the device claim can also be used in connection and be combined with the use claim, and such are disclosed, the same goes also vice versa, that means characteristics which are only mentioned in connection with the use claim can be employed, used and disclosed in the same way also with the device according to the invention.

The invention furthermore claims also protection for different part aspects without being fixed to the subject matter of the independent claims, that means each characteristic of the depending claims can be claimed for itself only or in connection with a device for recording biometric data, such as for example the lines of the fingers or hand, for example in the frame of a partial application, wherein a restriction of the independent claims does not exist here. Thus, for example, the characteristics with respect to the positioning control and the positioning sensor can also be used with devices where neither the illuminating unit nor the rest can traverse. The positioning control here offers also additional possibilities. Besides a guide of the traversing, positioning rest or illuminating unit the positioning control also produces the biometric information about the shape of the hand. By means of the evaluation of the positioning control also the respective perfect illuminating system is selected and employed. These aspects of the invention are also disclosed on their own, independently from the formulation of the independent claims.

The same also goes for the design of the recording unit which is also disclosed as independent from the design of the rest or the illuminating unit. It is also possible to design the recording unit in such a way that it can traverse and be positioned, and to realize the illumination or the rest comprehensible. This aspect is also disclosed.

The drawing shows an embodiment of the invention, the invention is in no way restricted to the here shown embodiment; there are a number of other modifications of the invention.

Figure 2:
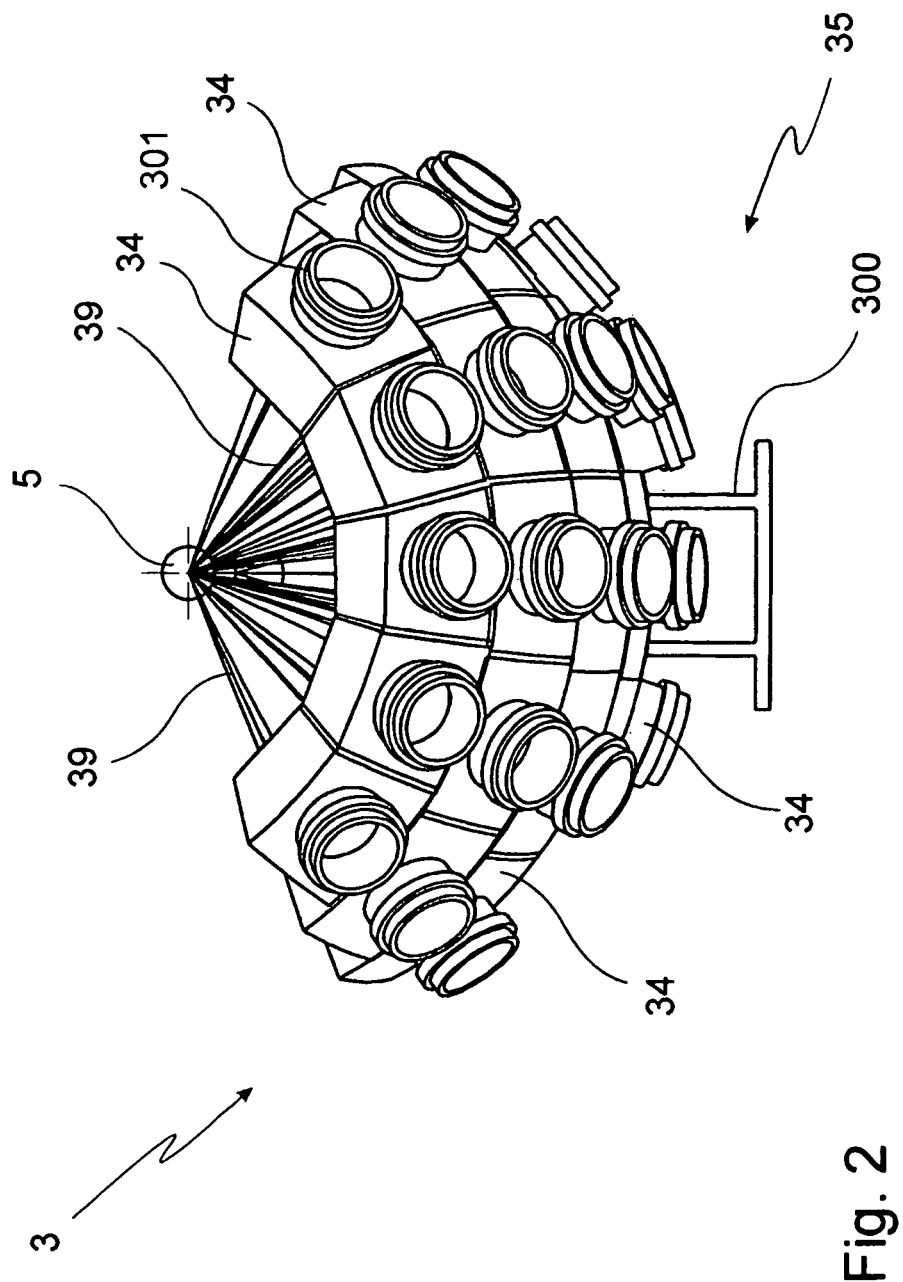
Figure 3:
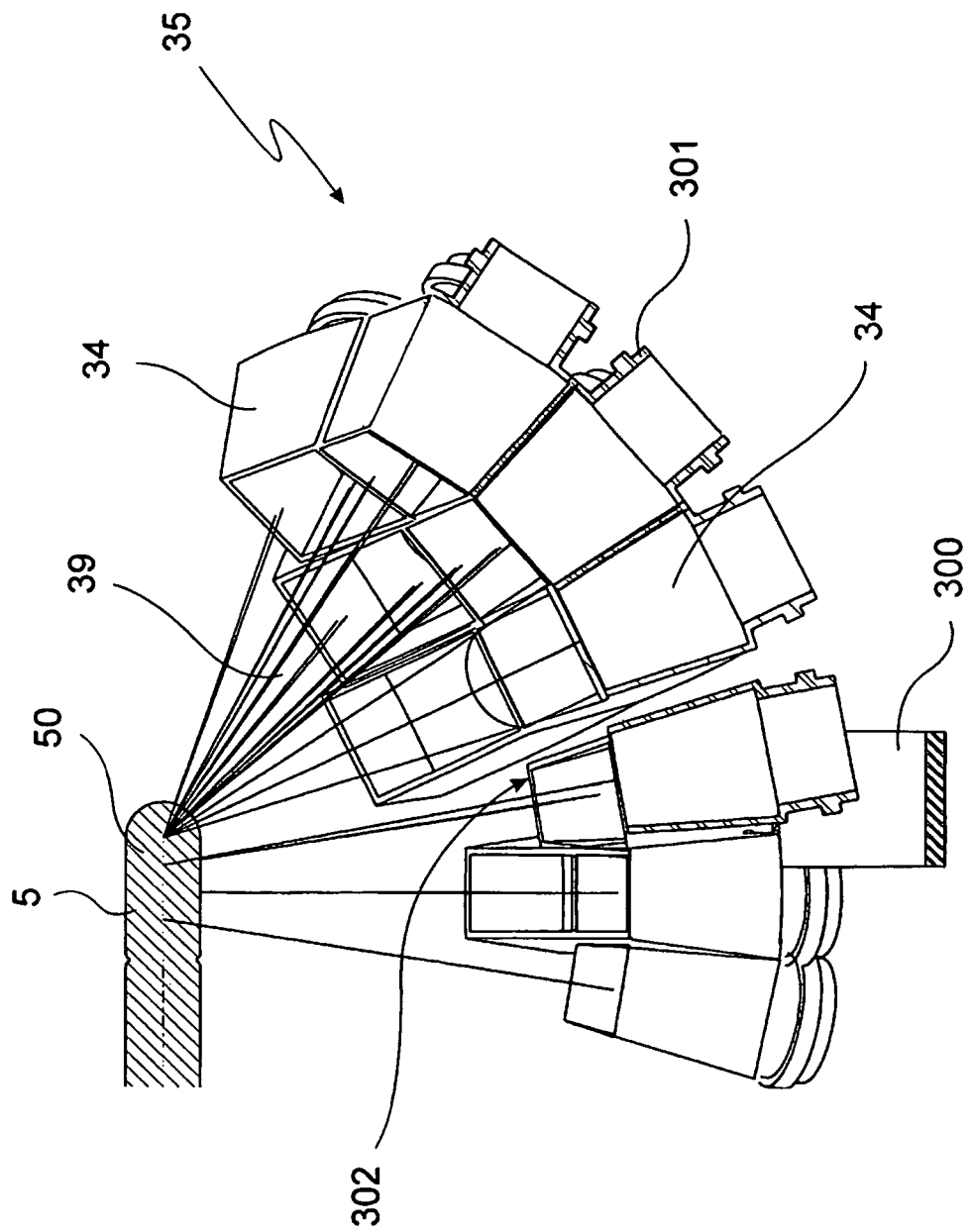
Figure 4:
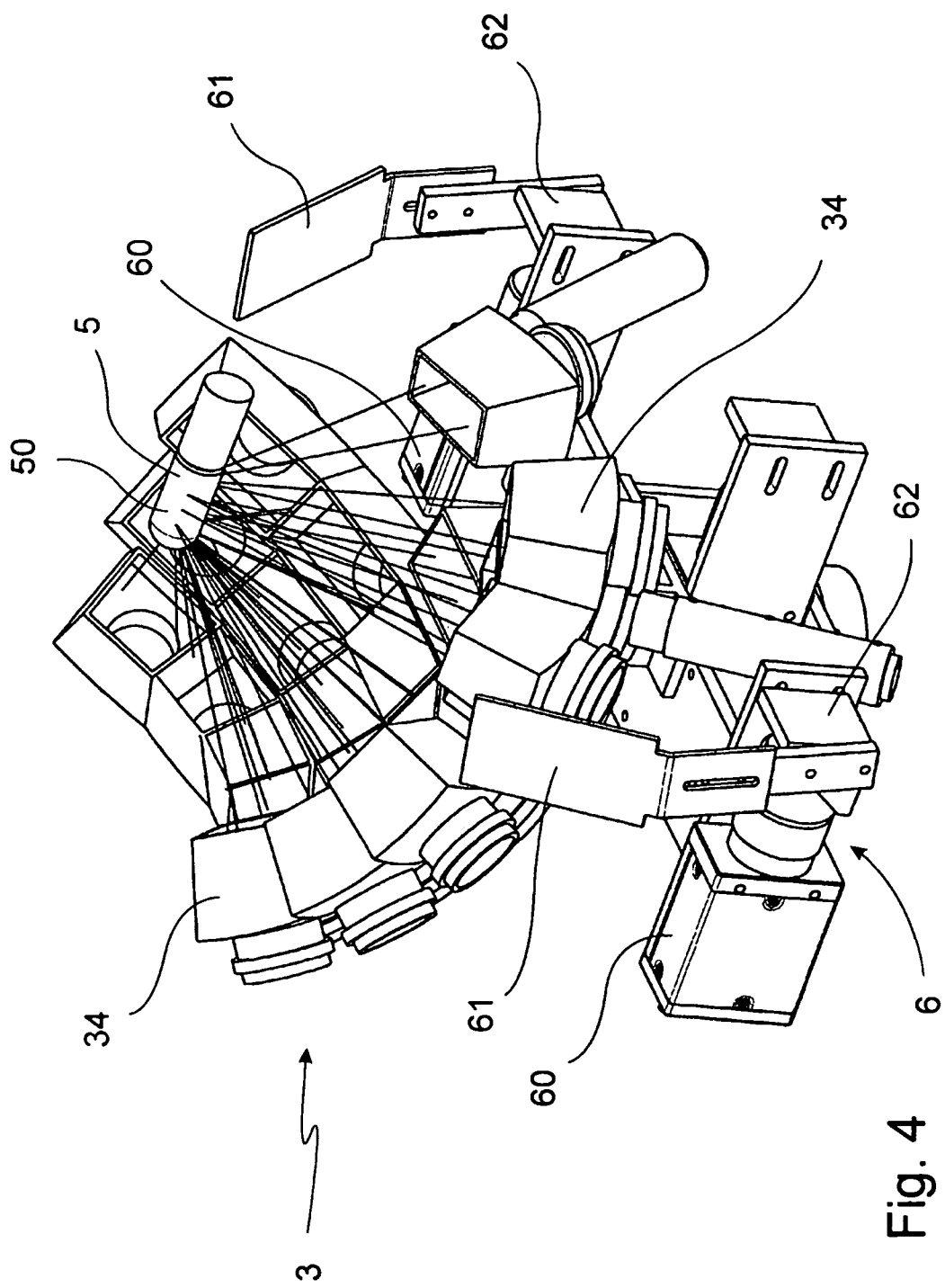
Figure 5:
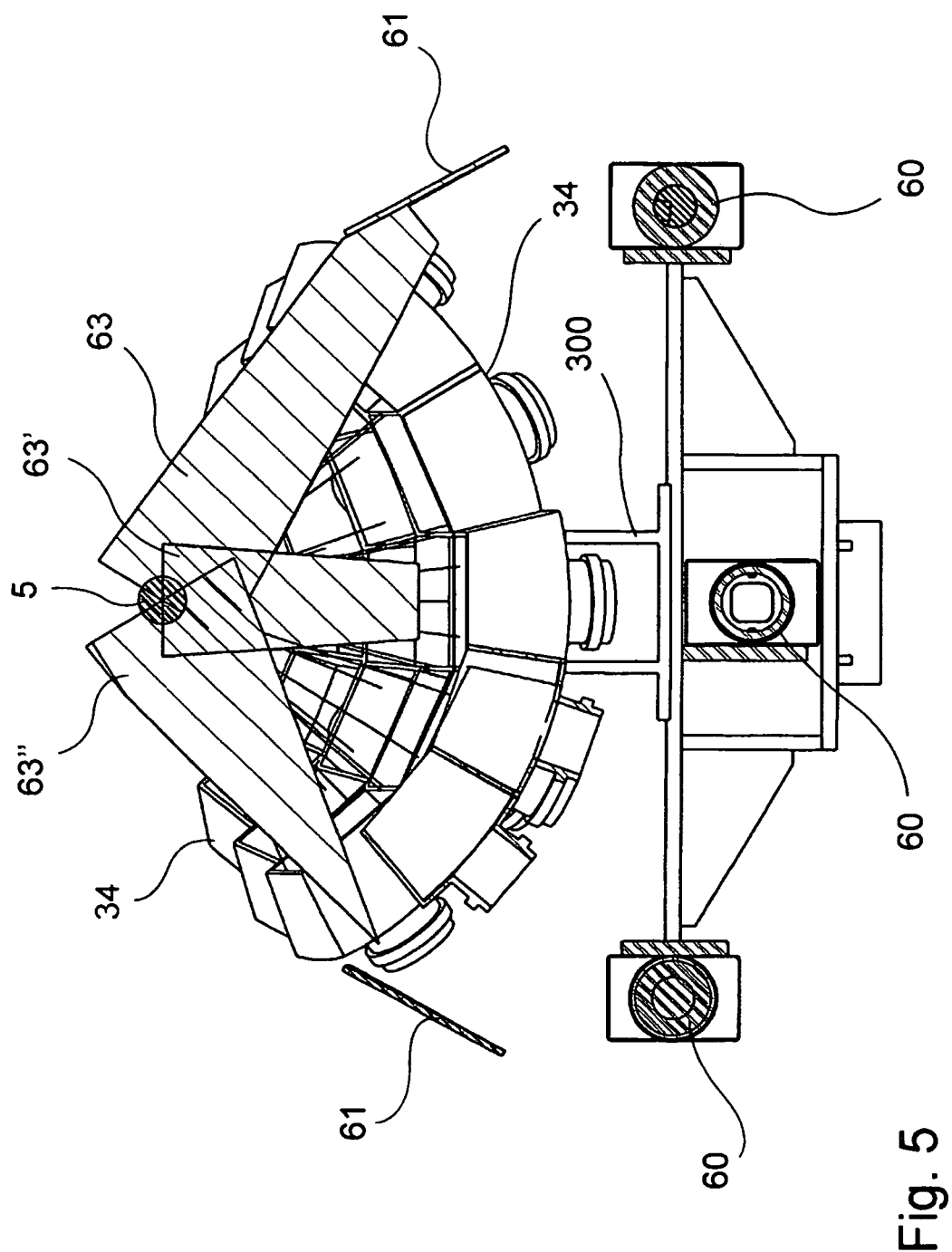
Figure 6:
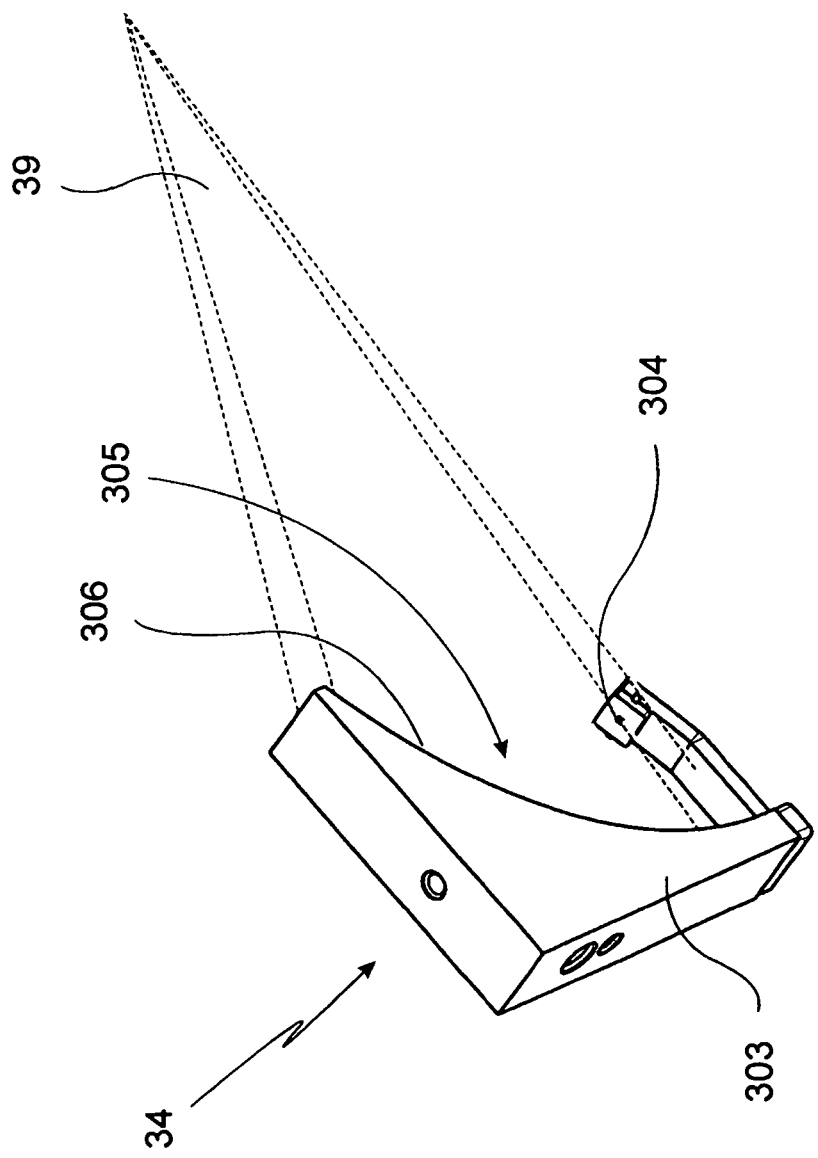
Figure 7:
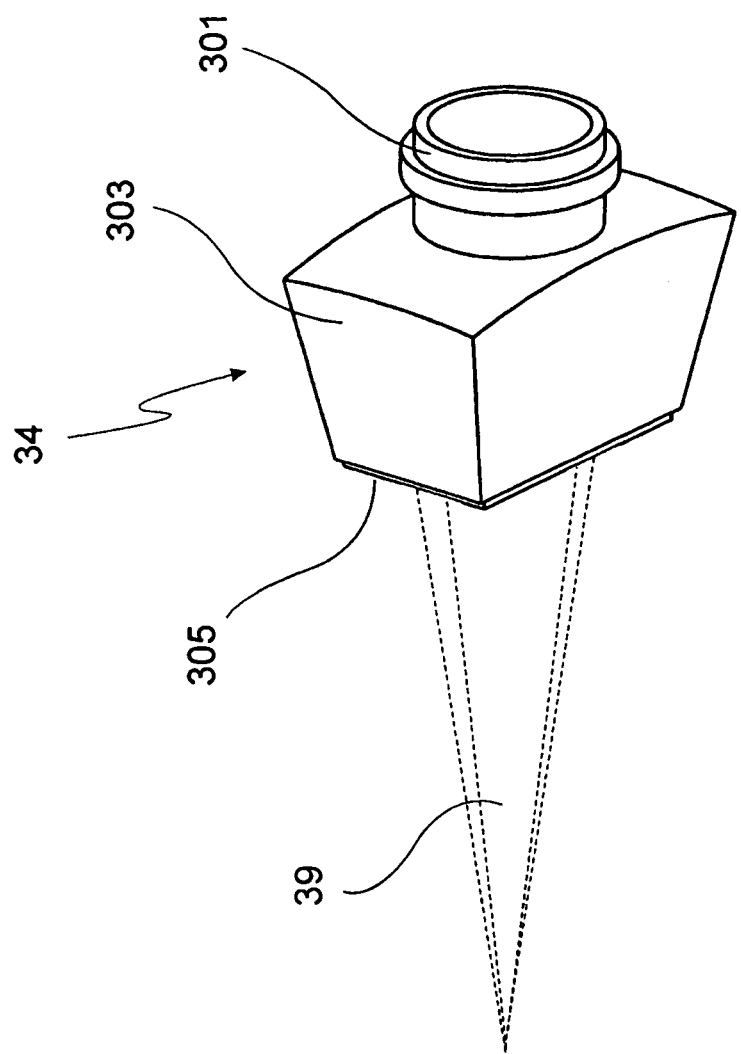

In the figures:

FIG. 1 a three-dimensional view of the device according to the invention,

FIG. 2 a three-dimensional view of the illuminating unit of the device according to the invention, seen in the direction of arrow II in FIG. 1, FIG. 3 a three-dimensional view of a vertical cut through the illuminating unit of the device according to the invention, FIG. 4 a three-dimensional view of the illuminating unit of the device according to the invention combined with the recording unit, FIG. 5 a three-dimensional view of a vertical cut through the combined illuminating unit/recording unit seen in the direction of arrow V of FIG. 1, FIGS. 6 and 7 each a three-dimensional view of different modifications of the illuminating element according to the invention.

The device 1 according to the invention is shown schematically in FIG. 1. For a better view in FIG. 1 the device 1 is drawn openly, actually the device 1 consists essentially of a housing 12 closed on several sides.

The housing 12 of the device 1, designed in this example essentially square, has on its upper side a box-like superstructure 10, below the superstructure 10 there is an opening 11. The opening 11 offers access to the interior of the device 1 without resistance where the movably supported illuminating unit 3 is provided. Opening 11, however, is monitored optically and/or electronically, for example by means of a light curtain (a monitoring instrument basing on a light barrier principle). The open design with the opening 11 allows a blur-free image of the hand or finger line to be recorded, otherwise provided transparent covers are soiled because of the dirt or sweat adhering to the fingers and interfere with a good recording; this disadvantage is avoided reliably by the suggested concept.

The hand not shown in FIG. 1 is supported on the rest 2. In this respect the rest 2 works here as a support, however, without limiting the rest 2 to such a purpose. In addition to supporting, however, the rest 2 also comprises the possibility of putting-on the hand laterally or from below to the rest 2, depending on the modification of the invention. In the embodiment shown here the rest 2 is the upper side of the device 1, thus it forms also the rest plane 20.

A positioning sensor 40 is provided above the opening 11 on the inside of the superstructure 10. The positioning sensor 40 is designed, for example, as infrared sensitive CCD camera and equipped in such a way that it images the complete hand positioned above the opening 11 and introduced in the superstructure 10.

The positioning sensor 40 is connected with the positioning control 4 via the sensor line 44. The positioning sensor 40 serves for transmitting information about the position, size and/or orientation of the fingers or the hand.

The positioning control 4 evaluates the information transmitted by the positioning sensor 40, and then interacts via the control lines 41, 42, 43 with different traveling drives 30, 31 or rotary drives 36 of the illuminating unit to position the illuminating unit 3 exactly below the finger.

The illuminating unit 3 shown in FIG. 1 is rather simple in construction. It consists of a U-shaped pivoted part 35 open upwards, carrying on its inside a number of single illuminating elements 34. Two single cameras 60 of the recording unit 6 are indicated schematically, they will be described in detail later on.

The pivoted part 35 sits on a slide movable along two guideways (axes) 32, 33 orientated rectangular to each other.

The guideway (axis) 32 and the guideway (axis) 33 are indicated schematically, cleverly a cross slide guide is provided in such a way that, for example, the Y-guideway 33 travels on the slide moving on the X-guideway 32. The pivoted part 35 is thus movable in a plane parallel to the two guideways (axes) 32, 33, and can also be positioned exactly because of the positioning control 4. Therefore, it is possible to position the illuminating unit 3 in a suitable way under the respectively recorded fingers.

The positioning control 4 acts here via the two control lines 41, 42 on the travel drive 30 (X-axis) or the travel drive 31 (Y-axis). The travel drives are designed, for example, as rotational drives, the guideway is realized, for example, as threaded spindle; there is a number of modifications how to realize the travel drive according to the invention, and, at the same time, provide a highly accurate positioning.

Besides the two linear axes in X- and Y-direction also the pivoted part 35 can rotate. The rotational axis 37 provided for that is rectangular to the plane defined by the guideways 32, 33. Furthermore, a rotary drive 36, that effects a rotating angle α (or swiveling angle) around the rotational axis 37 of the pivoted part 35, is provided on the illuminating unit 3.

The positioning control 4 acts also on this rotary drive 36; for that the control line 43 is provided. By means of the two travel drives 30, 31 as well as the rotary drive (36) an exact positioning of the illuminating unit 3 carrying the illuminating elements 34 is possible exactly below the finger which has to be recorded.

FIG. 2 shows a detail of the device 1 according to the invention. The visual angle chosen here is indicated in FIG. 1 by arrow II, the housing 12 of the device 1 being not shown for clearness sake.

In FIG. 2 a finger 5 is shown seen from the front. Ideally, this is circular or cylinder-like, wherein, of course, it has to be taken into consideration that the finger 5 of a person is an element with several members and a surface having concave and convex surface areas.

It can be seen clearly that a number of illuminating elements of the illuminating unit 3 is arranged following the circular shape of the finger 5 below it. Each of this large number of illuminating elements 34 points a light beam 39 on a special area of the surface of the finger shown ideally as surface area of a cylinder. Ideally, the light beams 39 are truncated cones or truncated pyramids, depending on the design of the optic image system of the respective illuminating elements 34.

According to the invention it has been noticed that a perfect recording with a recording unit requires a suitable illumination. In a modification according to the invention for recordings rich in contrast the bright field method has been suggested, that is also shown in FIG. 2; single cameras 60 (not shown in FIG. 2) observe the recording in total reflection of the light beam 39. Here the characteristic of the single cameras is used that they can observe a rather large segment of the space angle. One single camera 60 observes a segment of the surface of finger or hand that is illuminated by a number of illuminating elements 34.

The construction of the illuminating unit is as follows:

On a frame 300 in several rows or columns a number of illuminating elements 34 is arranged. Single illuminating elements 34 are designed like truncated pyramids in such a way that the surface facing the finger 5 is less than the backside where in circular connecting pieces 301 illuminating means and so on can be fixed.

The arrangement is chosen such that the illuminating elements form together a partial trough shape of the illuminating unit 3 that corresponds, in this respect, with the area of the finger tip. Because of similar distances it is possible to use similar optical image systems. Each illuminating element 34 projects here only a rather small illuminating segment onto the surface of the finger 5 which is typically a few square millimeters up to a few square centimeters. The result is a chequered division of the finger surface into a number of different illuminating segments.

FIG. 3 shows a side view according to FIG. 2. The curve of the partly trough-shaped arranged illuminating elements 34 of the illuminating unit 3 can be seen clearly; a partly trough-like illuminating surface 302 forms.

The construction of the illuminating unit 3 is chosen here in such a way that on the frame 300 a number of illuminating elements 34 is arranged, which are held among each other, for example, by gluing or welding.

The single illuminating elements are different from each other, or at least different in groups as they are arranged at different places of the illuminating surface 302. It is basically a self-supporting arrangement connected only at a few points with the frame 300; a rotary drive is arranged on the frame 300 which is able to rotate this entire upper part as pivot part 35.

In a preferred modification of the invention, as it is shown in FIG. 4, the illuminating unit 3 comprises also the recording unit 6. The recording unit 6 consists here of several single cameras 60 arranged in the example shown here below the illuminating elements 34. The recording unit 6 with its single cameras 60 and the other required optical elements (assorted deviation mirrors 61, 62) are also held by the frame 300, and are part of the rotary part 35. Thus, the recording unit 6 carries out exactly the same motions as the illuminating unit 3, and the optical conditions are the same for each positioning of the finger.

It has been found that for a perfect illumination the use of directional light emitted by a number of illuminating elements 34 arranged in the illuminating surface 302 is the best. A few of the illuminating elements 34 have, if necessary, even an additional task, namely the projection of bundles of parallel lines and/or a grid onto the surface of the finger 5 to make orientation possible.

The purpose is to achieve an image of the surface of the finger from nail to nail, that is over an angle segment of at least about 175° and more (about 180° to 220°). For that several single cameras 60 of the recording unit 6 are provided that result together in a stereoscopic picture of the surface 50 of the finger.

Through at least one deviation mirror 61, 62 the picture of the surface 50 of the finger is folded for the single cameras 60, which has the advantage of the single cameras 60 not having to be arranged in the illuminating surface 302 where there is little space anyway, but they can be arranged at a larger distance to the finger than the illuminating elements 34.

Through the first deviation mirror 61 here the respective lateral picture of the surface 50 of the finger is deviated downwards to a second deviation mirror 62. The second deviation mirror 62 deviates the image rectangular to guide it in single cameras 60 which are arranged in horizontal position. This realizes a very space-saving arrangement.

FIG. 5 shows a view in the direction of arrow V according to FIG. 1; this is a sectional view. The arrangement of the illuminating elements 34, which also define the partly trough-like illuminating surface 302, drawn up to the back can be seen clearly.

In this outlay the three single cameras 60 below the illuminating elements 34 can be discerned clearly. For the center single camera 60 vertical below the finger 5, an opening or a window is provided in a suitable way in the illuminating surface 302 to make the visual range 63' possible. Besides, the single visual ranges are indicated by 63, 63' and 63". In the idealized picture shown here the visual ranges 63, 63', 63" overlap considerably in such a way that the bottom single camera 60 (arranged in the center) could almost be deleted as its visual range 63' would also be covered by the two other adjacent visual ranges 63 and 63". However, this redundancy is convenient for a recording as good as possible as for a stereoscopic picture information just the image of the same item under different angles, that is in different visual ranges 63, 63', 63" is favourable. An accordingly large overlapping area is therefore an advantage. With reference to the respective illumination then, if necessary, different illuminating systems are chosen as the bright field illumination for a first single camera 60 may lead to a diffuse illumination of the other single cameras 60.

In FIGS. 6,7 different modifications of the illuminating element 34 of the illuminating unit 3 are shown. The different illuminating elements 34 are required in several types, in a larger number per illuminating unit 3.

In detail, an illuminating element 34 consists of a carrier 303, an illuminant 304 and an optical lens system 305 where the light beams 39 are projected, for example, as illuminating segment onto the surface 50 of the finger.

The carrier 303 has, on the one hand, the task of carrying the single elements of the illuminating element, that is the illuminant 304 and the optical lens system 305, because of the self-supporting construction of the illuminating unit 3, the carrier, however, is also a connection with the adjacent carriers of adjacent illuminating elements 34.

For example, a diode (LED) or the like is used as illuminant 304. Conveniently, rather narrow-banded emitting light sources are used, that are light sources which are, if possible, monochromatic, the light colour of which is adjusted perfectly to the respective sensitivity of the single cameras. A measurement of this kind improves the quality of the recording considerably.

There is a number of suggestions for the design of the optical lens system 305. In the modification shown in FIG. 6 a free-form reflector 306 is provided that is designed parabolic, and the illuminant 304 is arranged in the focus of this parabolic element.

FIG. 7 shows another modification of the illuminating element 34. The carrier 303 is designed here cube-like, the cube is realized like a truncated pyramid with a connecting piece 301 arranged on the backside where, for example, the illuminant and its electric links are arranged. On the front side opposite the connecting piece 301 there is an optical lens system 305.

The optical lens system 305 consists here, for example, of a diffuser for an even illumination of the illuminated field 39 as well as a lens or a Fresnel lens concluding the cube.

The claims filed with the application now and to be filed later on are attempted formulations without prejudice for obtaining a broader protection.

If here, on closer examination, in particular also of the relevant prior art, it turns out that one or the other feature may be convenient for the object of the invention, however, not decisively important, of course, already now a formulation is striven for that does not contain anymore such a feature, in particular in the main claim.

Furthermore, it has to be taken into consideration that the embodiments and modifications of the invention described in the different examples and shown in the figures can be combined with each other in any way. Here single or several characteristics can be exchanged at will. These combinations of characteristics are also disclosed.

References in the sub-claims relate to the further design of the matter of the main claim through the characteristics of the respective sub-claim. These are, however, not to be understood as a waiver of independent subjective protection of the matter for the characteristics of the referred sub-claims.

Characteristics only disclosed in the description so far may, in the course of proceedings, be claimed as of inventive relevance, for example to distinguish from the state of the art.

Characteristics only disclosed in the description or even single characteristics of claims comprising a number of characteristics may be taken over in the first claim at any time to distinguish from the state of the art, and this is even if such characteristics have been mentioned in connection with other characteristics, and achieve particularly convenient results in connection with other characteristics, respectively.

The invention claimed is:

1. A device for the contactless recording of biometric data of finger or hand lines, comprising:
   a rest for the hand and fingers, respectively, that can be traversed and positioned;
   an illuminating unit that can be traversed and positioned, the illuminating unit comprising:
      a recording unit comprising several single cameras, and
      two or more illuminating groups each of which comprising at least one illuminating element, and the illuminating element emit light at different time; and
   a positioning control;
   wherein the positioning control evaluates information about the position and size and direction of the finger or hand;
   wherein the illuminating unit generates an illumination area and projects two bundles of lines onto the surface of the fingers or hand, said two bundles of lines cutting each other at a certain angle to form a grid projection;
   wherein the light color of the bundles of lines differs from the light color of the illumination areas;
   wherein the illuminating unit is configured such that, in a first illuminating group, the illuminating elements can be switched on that are required for the recording of single cameras each time positioned outside, 50° to 80° laterally with respect to the center axis of a finger, and after that, the illuminating elements are switched off, and then the illuminating groups for one of the single cameras are switched on, the one of the single cameras being centrally arranged with respect to the central axis of the finger.

2. The device according to claim 1, characterized by a stationary illuminating unit and/or stationary rest.

3. The device according to claim 1, characterized in that another light color of the line bundles or the grid projection is provided for the light color of the radiation of the illuminated areas, and/or the illuminating unit has an illuminant, or reflects an illumination field.

4. The device according to claim 1, characterized in that on the device a positioning sensor is provided that transfers information about the position, size and/or direction of the fingers and/or hands to the positioning control.

5. The device according to claim 1, characterized in that a positioning sensor is provided on the device, and the positioning sensor is designed in such a way that it travels together with the illuminating unit, or the positioning sensor is designed in such a way that it travels with the rest.

6. The device according to claim 1, characterized in that a positioning sensor is provided on the device, and the positioning sensor or a position recording camera defines the position of the hand and/or all the fingers with one recording, and this recorded information is transmitted by the positioning control to the traveling drive(s) for positioning the illuminating unit.

7. The device according to claim 1, characterized in that on the device a positioning sensor is provided, and during a positioning of the illuminating unit or the rest with reference to a first finger or hand area the current position of the finger or the hand area is continuously recorded by the positioning sensor, and the information about position, size and/or direction of the finger or the hand area is continuously transmitted for readjusting purposes of the rotational or travel drives to the positioning control.

8. The device according to claim 1, characterized in that on the device a positioning sensor is provided, and the positioning sensor determines during a positioning of the illuminating unit or the rest with reference to a first finger or hand area the position, size and/or direction of a second finger or hand area, and transmits it to the positioning control, that then determines the positioning data for the rotating or traveling drives so that after finishing the recording of the biometric data on the first finger or hand area a positioning on the second finger or hand area is carried out.

9. The device according to claim 1, characterized in that the illuminating unit and the rest, respectively, can be traversed and positioned in one or more plane(s) along two axes orientated rectangular to each other.

10. The device according to claim 1, characterized in that the plane is arranged at the side next to the rest, or the plane is orientated essentially vertically or horizontally, and/or the plane is orientated essentially parallel to the rest.

11. The device according to claim 1, characterized in that the illuminating unit has a rotary part that can rotate around a rotational axis, carries the illuminating elements and can be moved and positioned by a rotary drive.

12. The device according to claim 1, characterized in that the illuminating unit is equipped with at least two sorts of different illuminating elements differing in the color of the emitted light.

13. The device according to claim 1, characterized in that in the device further means of illumination are provided, in particular the light emitted by the illuminating unit and the light emitted by the means of illumination has identical or different color, and/or directional light of the illuminating elements of the illuminating unit is provided.

14. The device according to claim 1, characterized in that at least one illuminating element of the illuminating unit is provided, and the illuminating element has at least one illuminant, wherein the illuminating element has preferably an imaging lens system for picturing the light segment generated by the illuminant to an illuminated segment of the hand or the finger.

15. The device according to claim 1, characterized in that a diffuse light field of the illuminating unit is provided, and/or an illuminating element of the illuminating unit has at least two illuminants, and at least two imaging lens systems are provided for picturing the light segments generated by the illuminants to segments different on the hand or finger, and/or the imaging lens system comprises at least one or more of the following optical components, namely a diffuser, a lens, a Fresnel lens, a freeform reflector, a paraboloidal-type reflector, an objective, a reflector, a prism or the like.

16. The device according to claim 1, characterized in that the illuminating unit is arranged above a rest plane in such a way that the finger is illuminated from above the bed of the nail, and/or the illuminating elements are arranged on the illuminating unit in a sort of a partial trough shape corresponding with the surface of the underside of the finger tip, and thus form an illuminating surface, wherein further illuminating elements are provided spaced apart from the illuminated surface.

17. The device according to claim 1, characterized in that an illumination control and a positioning control are provided, and the positioning control transmits information about the position, size and/or direction of the fingers and/or the hand to the illuminating control, and the illumination control selects the employed illuminating groups and their sequence, wherein the illuminating unit has at least one illuminant, and as illuminant an LED, a laser diode, a laser, a lamp, a small size illuminant or a halogen lamp or the light emitting exit of an optical waveguide is provided, and/or as light color of the illuminating elements cyan, green and/or blue is used, wherein the illuminating segments arranged adjacent on the fingers or the hand are illuminated by light with different light color.

18. The device according to claim 1, characterized in that a recording unit is provided that travels with the illuminating unit, wherein the recording unit consists of several individual cameras, and the individual cameras are arranged, with reference to the circumference of the finger, distributed in such a way that a recording of the entire finger lines is carried out in an angle segment of at least 175° with reference to the center point of the finger, preferably from bed of the nail to bed of the nail.

19. The device according to claim 1, characterized in that a stroboscope illumination of the illuminating unit is provided that is synchronized with the recording by the recording unit or individual cameras.

20. The device according to claim 3, wherein the illuminating unit is a reflector.

21. The device according to claim 3, wherein the illuminating unit has an additional drive, and/or the positioning control acts on the adaptation drive.

22. The device according to claim 4, wherein the positioning sensor is arranged stationary on the device.

23. The device according to claim 5, wherein at least one traveling drive is provided for the traversing of the illuminating unit and the rest, respectively, and the positioning control acts on the traveling drive.

24. The device according to claim 11, wherein the positioning control acts on the rotary drive, and the rotational axis is oriented to the plane rectangularly.

\* \* \* \* \*